United States Patent
Park

(10) Patent No.: US 9,915,027 B2
(45) Date of Patent: *Mar. 13, 2018

(54) CORE-FREE THERMOPLASTIC POLYURETHANE YARN FORMED WITH RESIN AND METHOD FOR PRODUCING SAME

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,999

(22) Filed: Nov. 10, 2016

(65) Prior Publication Data

US 2017/0370045 A1    Dec. 28, 2017

Related U.S. Application Data

(63) Continuation-in-part of application No. 15/190,503, filed on Jun. 23, 2016.

(30) Foreign Application Priority Data

Oct. 24, 2016  (KR) .......................... 10-2016-138458

(51) Int. Cl.
    *C08J 3/20*      (2006.01)
    *D06M 15/564*    (2006.01)
    *C08K 3/36*      (2006.01)
    *C08J 3/22*      (2006.01)

(52) U.S. Cl.
    CPC ............. *D06M 15/564* (2013.01); *C08J 3/22* (2013.01); *C08K 3/36* (2013.01); *C08J 2375/04* (2013.01)

(58) Field of Classification Search
    CPC .. C09D 175/06; C09D 175/08; D06M 15/564
    See application file for complete search history.

(56) References Cited

U.S. PATENT DOCUMENTS

2014/0308454 A1*  10/2014  Park ................... C09D 175/04
                                                                427/434.6
2015/0211175 A1*   7/2015  Hino ...................... D04H 1/54
                                                                  428/394

* cited by examiner

*Primary Examiner* — Hannah Pak
(74) *Attorney, Agent, or Firm* — Park & Associates IP Law, P.C.

(57) ABSTRACT

The present invention relates to a resin for a thermoplastic polyurethane yarn, comprising: thermoplastic polyurethane; and silica nanopowder. The present invention also relates to a method for producing a thermoplastic polymer yarn having a thickness of 50 denier or less by use of silica nanopowder having a particle size of 5-30 nm as a thickener. The thermoplastic polyurethane resin according to the present invention has desired processability and physical properties.

2 Claims, No Drawings

CORE-FREE THERMOPLASTIC POLYURETHANE YARN FORMED WITH RESIN AND METHOD FOR PRODUCING SAME

REFERENCE TO RELATED APPLICATIONS

This is a continuation-in-part of pending U.S. patent application Ser. No. 15/190,503 filed on Jun. 23, 2016, and claims priority of Korean Patent Application No. 10-2016-138458 filed on Oct. 24, 2016, the entire contents of which are incorporated herein by reference.

FIELD OF THE INVENTION

The present invention relates to a resin for a thermoplastic polyurethane resin, which comprises silica nanopowder, and a method for producing a thermoplastic polyurethane yarn using the resin. More specifically, the present invention relates to resin for a thermoplastic polyurethane (TPU) yarn, which comprises silica nanopowder that makes it possible to continuously produce a TPU yarn having a diameter of 50 denier or less without causing yarn breakage, and to a method for producing a thermoplastic polyurethane resin using the resin.

BACKGROUND OF THE INVENTION

As is well known in the art, yarns which are used for industrial applications or as materials for shoe uppers are generally made of polyester, nylon, acrylic resin or the like. Fabrics made of such yarns have insufficient durability and abrasion resistance and also problems in terms of adhesive strength and the like, and for this reason, the use of such yarns for high-functionality applications is not suitable.

To solve such problems and increase the strength of yarns, coated yarns obtained by coating the surface of yarns with thermoplastic resins are currently being used. Such coated yarns are generally produced by coating yarns (such as polyester or nylon yarns) with thermoplastic resin such as polyvinyl chloride (PVC), polypropylene (PP) or thermoplastic polyurethane in the dice of a conventional extruder.

However, where conventional thermoplastic resin as described above is used, there are disadvantages in that it is difficult to control the amount of coating with this thermoplastic resin, and particularly, it is difficult to apply this thermoplastic resin in small amounts, and thus the use of this resin can provide only coated yarns having a thickness of 300 denier or more, which also have poor durability or abrasion resistance.

In order to solve such problems, up to date since 2012, the present inventor has conducted studies on a method for production of a coated yarn, a compound for a coated yarn, a thermoplastic polyurethane-coated yarn, etc. (see Patent Documents 1 to 4 below).

The inventions disclosed in such Patent Documents make it possible to produce a coated yarn not only exhibiting excellent abrasion resistance, adhesive strength, waterproof ability and moldability, but also having a relatively thin thickness. However, in the case of coated yarns having a core formed of polyester or nylon, there is a limit to reducing the thickness of the coated yarn, and thus it is impossible to produce a coated yarn having a very thin thickness, preferably a thickness of 50 denier or less.

In addition, in the case of a thermoplastic polyurethane yarn (TPU)-coated yarn disclosed in the prior art patent documents, a thickener is necessarily required for smooth extrusion, because the thermoplastic polyurethane has a lower viscosity than polyester or nylon.

Unlike the TPU-coated yarn, an uncoated yarn such as a mono-filament yarn having a large thickness can be produced using silica having a general size as a thickener. However, in the case of a mono-filament yarn or multi-filament yarn having a small thickness, particularly a thickness of 50 denier or less, general silica powder cannot be applied, because the yarn should be produced to have a small thickness.

SUMMARY OF THE INVENTION

The present invention has been made in order to solve the problems of the thermoplastic polyurethane-coated yarns disclosed in the above-described prior art patent documents, and it is an object of the present invention to provide a resin for a thermoplastic polyurethane (TPU) yarn, which comprises silica nanopowder as a thickener suitable for producing a core-yarn TPU yarn having a small thickness so as to exhibit desired processability and physical properties, and a method for producing a thermoplastic polyurethane (TPU) yarn using the resin.

Another object of the present invention is to provide a resin for a thermoplastic polyurethane yarn, which comprises silica nanopowder that makes it possible to produce a thermoplastic polyurethane (TPU) yarn having a thickness of 50 denier or less, and a method for producing a thermoplastic polyurethane yarn using the resin.

To achieve the above object, the present invention provides a resin for a thermoplastic polyurethane yarn, comprising: thermoplastic polyurethane; and silica nanopowder having a particle size of 30 nm or less, preferably 5-30 nm.

The present invention also provides a method for producing a thermoplastic polyurethane yarn using the above-described resin, the method comprising the steps of: (1) preparing liquid raw materials, which comprise polyol, isocyanate and short-chain glycol, respectively, and are used for preparation of thermoplastic polyurethane (TPU) polymer pellets, and selecting any one selected from among the liquid raw materials, and adding and compounding silica nanopowder having a particle size of 30 nm or less into the selected liquid raw material; (2) simultaneously introducing the silica nanopowder-dispersed liquid raw material of step (1) and the remaining two raw materials into a reaction-type extruder to form TPU polymer pellets to thereby produce a resin for a TPU yarn; and (3) introducing the resin for the TPU yarn into a yarn extruder, and melt-extruding the introduced resin through the yarn extruder, thereby producing a thermoplastic polyurethane yarn having a thickness of 50 denier or less.

The present invention also provides a method for producing a thermoplastic polyurethane yarn, comprising the steps of: compounding thermoplastic polyurethane with silica nanopowder having a particle size of 30 nm or less to prepare a pellet-type master batch, and compounding the master batch with thermoplastic polyurethane to prepare a resin for producing a yarn; and introducing the resin into a yarn extruder, and melt-extruding the introduced resin, thereby producing a thermoplastic polyurethane yarn having a thickness of 50 denier or less.

DETAILED DESCRIPTION OF THE INVENTION

Hereinafter, preferred embodiments of the present invention will be described in detail. In the following detailed description, exemplary embodiments of the present invention, which achieve the above-described technical objects, will be presented. In addition, other embodiments of the present invention, which are not described herein, will be apparent from the following description.

In the present invention, unlike the inventions disclosed in the above-described Patent documents, the surface of a polyester or nylon yarn is not coated with thermoplastic polyurethane. Specifically, in the present invention, thermoplastic polyurethane alone is compounded with silica nanopowder having a particle size of 5-30 nm, which serves as a thickener suitable for producing a yarn having a small thickness, preferably a thickness of 50 denier or less, so that the resulting resin can have desired processability and physical properties. Therefore, the present invention is intended to provide a resin for a thermoplastic polyurethane resin, which comprises silica nanopowder, and a method for producing a thermoplastic polyurethane yarn using the resin.

The present invention also provides a method capable of producing a core-free thermoplastic polyurethane yarn by compounding a silica nanopowder-containing master batch with thermoplastic polyurethane and melt-extruding the compound through a yarn extruder.

For this, the following requirements should be satisfied: 1) a thermoplastic polyurethane (TPU) resin composition, which is used for production of a thermoplastic polyurethane yarn, and a method for preparation of the composition, should be disclosed in detail; 2) a method for preparation of a master batch for a thermoplastic polyurethane yarn and the composition thereof should also be disclosed in detail; and 3) a method of producing a core-free thermoplastic polyurethane yarn using the TPU resin or the master batch should be disclosed in detail.

Hereinafter, preferred embodiments of the present invention will be described in detail.

Embodiment 1

The present invention is directed to a method of producing a thermoplastic polyurethane (hereinafter also referred to as "TPU") yarn from TPU alone without coating the surface of a polyester or nylon yarn with TPU. Herein, the TPU yarn may be a mono-filament yarn or a multi-filament yarn.

Thermoplastic polyurethane that is used in the present invention is virgin TPU. The virgin TPU is prepared by polymerizing polyester polyol, polyether polyol, polycarprolactone or the like with aromatic isocyanate or aliphatic isocyanate using short chain glycol (e.g., 1,4-butanediol) as a chain extender.

In the present invention, in addition to the virgin TPU, various TPU scraps, including a scrap remaining after high-frequency welding work of TPU for footwear or a scrap remaining after hot-melt processing of TPU, may be used alone or in combination with virgin TPU.

In the present invention, a core-free TPU yarn is produced without coating the surface of a polyester or nylon yarn with TPU. In this production process, a thickener or an inorganic material (talc or CaCO3) having a thickening effect is used so that the TPU yarn will be continuously extruded without being broken during an extrusion process to thereby increase the production of the yarn and so that the processability of the yarn will be improved.

In the present invention, silica powder is preferably used as a thickener. The silica powder is added to a liquid raw material for synthesis of TPU to prepare TPU resin. Alternatively, the silica powder is compounded with general TPU to prepare a master batch.

Particularly, in the present invention, a TPU resin prepared using silica nanopowder (preferably, silica nanopowder having a particle size of 5-30 nm), or a master batch prepared by compounding TPU with the silica nanopowder, is used, because it is impossible to produce a TPU yarn having a small thickness of 50 denier or less when silica having a general particle size is used.

Specifically, in the present invention, silicon nanopowder having a particle size of 5-30 nm is added to any one of liquid raw materials which comprise polyol, isocyanate and short-chain glycol, respectively, and which are used for preparation of TPU polymer pellets. The mixture is stirred sufficiently and polymerized with the remaining two raw materials to form TPU polymer pellets, thereby preparing a resin for a TPU yarn. Herein, the content of the silica nanopowder is preferably 10 wt % or less. If the silica nanopowder is added in an amount of more than 10 wt %, there will be a disadvantage in that stirring is difficult.

In addition, in the present invention, a resin for a TPU yarn may also be prepared by compounding silica nanopowder having a particle size of 5-30 nm with general TPU to prepare a master batch and compounding TPU resin with a predetermined amount of the master batch. In the process of compounding silica powder TPU to prepare the master batch, the content of the silica nanopowder is 40 wt % or less. If the silica nanopowder is used in an amount of more than 40 wt %, a problem will arise in that the silica nanopowder is not compounded with TPU so that the master batch cannot be prepared and a TPU yarn cannot be produced. For this reason, when silica nanopowder having a particle size of 5-30 nm is to be compounded with TPU, the silica nanopowder is added in an amount of 40 wt % or less. To prepare the most ideal master batch, the content of the silica nanopowder is preferably 30 wt %.

Hereinafter, a detailed description will be made of 1) a method of preparing a resin for a TPU yarn by adding silica nanopowder to a liquid raw material for preparation of TPU, 2) a method of preparing a master batch by compounding silica nanopowder with TPU, and 3) a method of producing a core-free TPU yarn using the resin for the TPU yarn or the master batch.

1. Method for Preparing Resin for TPU Resin According to the Present Invention

The method for preparing the resin for the TPU yarn is a method of preparing a resin by adding silicon nanopowder to a liquid raw material for preparation of TPU polymer pellets and polymerizing the silicon nanopowder-containing liquid material. The method of preparing the resin comprises the following four steps.

Step 1: Liquid raw materials for preparation of TPU polymer pellets are prepared. Specifically, polyol, isocyanate and short-chain glycol are prepared.

Step 2: Any one is selected from among the liquid raw materials prepared in step 1, and silica nanopowder having a particle size of 5-30 nm is added and compounded into the selected liquid raw material. Herein, the compounding is preferably performed at a temperature of 80 to 100° C. and a stirring speed of 20-30 rpm. For example, in the present invention, silica nanopowder is mixed with polyol, followed by compounding.

Step 3: The silica powder-dispersed liquid raw material of step 2 and the remaining two raw materials are simultaneously introduced into a reaction-type extruder to prepare TPU polymer pellets.

Step 4: The TPU polymer pellets of step 3 are dried and aged, thereby obtaining a resin for a TPU yarn according to an embodiment of the present invention.

2. Method for Preparation of Master Batch According to the Present Invention

Step 1: The above-described TPU (for example, virgin TPU, a TPU scrap, or a mixture thereof) and silica nanopowder having a particle size of about 30 nm or less (preferably 5-30 nm) are prepared to have predetermined contents. Herein, the content of the silica nanopowder is 40 wt % or less.

Step 2: The silica nanopowder and TPU are introduced into a conventional kneader, and then compounded with each other at a temperature of 100 to 120° C. and a speed of 20-30 rpm.

Step 3: The TPU compounded with the silica nanopowder is cooled, crushed to a diameter of less than 10 mm, and then introduced into a conventional twin extruder. Herein, the temperature of the twin extruder is 150 to 200° C.

Step 4: The resin compounded in the twin extruder is pelletized while it is passed through cooling water at 15 to 20° C.

Step 5: The master batch prepared through the above-described steps 1 to 4, specifically a pellet-type master batch, is dried and aged according to a conventional method.

Step 6: The master batch prepared as described above is compounded with conventional TPU, thereby preparing a TPU resin for yarn production.

3. Method for Producing TPU Yarn According to the Present Invention

A method for production of a TPU yarn, described in detail below, is a method of producing a core-free TPU yarn without coating the surface of a polyester or nylon yarn with TPU, unlike the inventions disclosed in the prior art patent documents.

Step 1: Pellets for yarn production (specifically, (1) TPU resin compounded with silica nanopowder, or (2) TPU resin prepared by mixing and compounding the silica nanopowder-containing master batch with TPU) are placed in a conventional yarn extruder and melt-extruded at a temperature of 170 to 230° C. through the extruder.

Step 2: Melt extrusion through the extruder, a TPU yarn released through the dice of the extruder is cooled in cooling water at 25 to 40° C.

Step 3: The cooled yarn is drawn. In the present invention, the cooled yarn is drawn about 7 or less. If the yarn is drawn 7 times or more, yarn breakage occurs.

Step 4: The drawn yarn is annealed in a conventional heating chamber at a temperature of 150 to 160° C.

Step 5: The annealed yarn is wound, thereby producing a TPU yarn having a thickness of 50 denier or less according to an embodiment of the present invention. Specifically, when polyester or nylon corresponding to the core of a TPU yarn is not used, a TPU yarn having a thickness of 50 denier or less can be produced without coating the surface of a polyester or nylon yarn with TPU.

The above-described production method is a method of producing a mono-filament yarn or a multi-filament yarn using a silica nanopowder-containing thermoplastic polyurethane resin.

Meanwhile, in order to evaluate the physical properties of the TPU yarn produced according to the above-described method, the physical properties of each of 1) TPU resin prepared using the silica nanopowder-containing TPU resin and 2) TPU resin prepared using the silica nanopowder-containing master batch were measured, and the results of the measurement are shown in Tables 1 and 2 below.

First, varying amounts of silica nanopowder were added to conventional TPU, followed by to prepare TPU resins, and the physical properties of the prepared TPU resins were tested. The results of the test are shown in Table 1 below.

Specifically, in a process of preparing silica nanopowder-containing TPU resin according to the present invention, silica nanopowder was added to TPU in varying amounts of 0 phr, 3 phr, 5 phr, 7 phr and 10 phr, and the viscosity change, extrusion processability and surface state of the resin were observed during polymerization. Herein, as the TPU, polyester polyol-based TPU having a hardness of shore 75D was used.

TABLE 1

| Test grade | MFI (230° C., 2.16 kg) (g/10 min) | Tfb (° C.) | Melt viscosity (Pa · s) 230° C. | Melt viscosity (Pa · s) 235° C. | Content of silica nanopowder in silica nanopowder-containing TPU resin |
|---|---|---|---|---|---|
| T-75D-1 | 30.21 | 218.4 | 32620 | 10060 | 0 phr |
| T-75D-2 | 28.33 | 219.5 | 33480 | 11670 | 3 phr |
| T-75D-3 | 25.42 | 220.6 | 38570 | 13150 | 5 phr |
| T-75D-4 | 18.25 | 221.3 | 42550 | 15090 | 7 phr |
| T-75D-5 | 12.33 | 222.5 | 48080 | 17220 | 10 phr |

In Table 1 above, T-75D-1, T-75D-2, T-75D-3, T-75D-4 and T-75D-5 set forth in "Test grade" are the trade names of TPU resins containing silica nanopowder in amounts of 0 phr, 3 phr, 5 phr, 7 phr and 10 phr, respectively.

Referring to Table 1 above, the extrusion processabilities and surface states of TPU yarns will now be described.

When a TPU yarn was produced using the TPU resin (trade name: T-75D-1) without using the silica nanopowder-containing resin of the present invention, there were problems in that severe yarn breakage occurs due to the excessively high flowability of the resin during extrusion and in that the surface of the TPU yarn becomes rough.

When a TPU yarn was produced using the TPU resin containing 3 phr of silica nanopowder (trade name: T-75D-2) according to the present invention, the extrusion processability of the resin was good, no yarn breakage occurred, and the yarn had a good surface.

When a TPU yarn was produced using the TPU resin containing 5 phr of silica nanopowder (trade name: T-75D-3) according to the present invention, the extrusion processability of the resin was good while yarn breakage during extrusion did not occur and the TPU yarn had a good surface.

When a TPU yarn was produced using the TPU resin containing 7 phr of silica nanopowder (trade name: T-75D-4) according to the present invention, the resin showed a melt flow index of 18.25 g/10 min and a flow beginning temperature (Tfb) of 221.3° C., indicating that it had good extrusion processability. Furthermore, it showed melt flow indices (Pa·s) of 42550 at 230° C. and 15090 at 235° C., indicating that there was no yarn breakage during extrusion. In addition, the TPU yarn had a good surface.

When a TPU yarn was produced using the TPU resin containing 10 phr of silica nanopowder (trade name: T-75D-5) according to the present invention, there was a disadvantage in that the TPU yarn had a slippery surface.

The test results indicated that, in the process of producing the TPU yarn by adding silica nanopowder and performing polymerization, it is most preferable to added the silica nanopowder in an amount of 3-7 phr. In addition, where the silica nanopowder was added in an amount of 10 phr, there was difficulty in compounding the silica nanopowder with the liquid raw material.

Second, a test was performed using varying contents of a master batch containing the silica nanopowder compounded with conventional TPU, and the results of the test are shown in Table 2 below.

Specifically, in the process of producing a TPU yarn by compounding conventional TPU with a master batch (containing 30 wt % of silica nanopowder) according to the present invention, the viscosity change, extrusion processability and surface state of the resin was observed while the master batch was compounded with the TPU in varying amounts of 0 phr, 3 phr, 5 phr, 10 phr and 20 phr. Herein, as the TPU, polyester polyol-based TPU having a hardness of shore 75D was used.

TABLE 2

| Test grade | MFI (230° C., 2.16 kg) (g/10 min) | Tfb (° C.) | Melt viscosity (Pa · s) 230° C. | 235° C. | Content of master batch |
|---|---|---|---|---|---|
| NS-75D-1 | 19.58 | 215.2 | 35580 | 11010 | 0 phr |
| NS-75D-2 | 16.83 | 216.3 | 31860 | 11450 | 3 phr |
| NS-75D-3 | 14.32 | 218.2 | 40950 | 12830 | 5 phr |
| NS-75D-4 | 8.35 | 222.3 | 44380 | 14030 | 10 phr |
| NS-75D-5 | 6.23 | 219.3 | 50570 | 16930 | 20 phr |

In Table 2 above, NS-75D-1, NS-75D-2, NS-75D-3, NS-75D-4 and NS-75D-5 set forth in "Test grade" are the trade names of TPU resins containing the master batch in amounts of 0 phr, 3 phr, 5 phr, 10 phr and 20 phr, respectively.

Referring to Table 2 above, the extrusion processabilities and surface states of TPU yarns will now be described.

When a TPU resin was produced using the TPU resin containing no master batch (trade name: NS-75D-1), there were problems in that severe yarn breakage occur due to the excessively high flowability of the resin during extrusion and in that the surface of the TPU yarn becomes rough.

When a TPU yarn was produced using the TPU resin containing 3 phr of the master batch (trade name: NS-75D-2) according to the present invention, the resin was easily flowable during extrusion, yarn breakage occurred, and the surface of the TPU yarn was slightly rough.

When a TPU yarn was produced using the TPU resin containing 5 phr of the master batch (trade name: NS-75D-3) according to the present invention, the resin showed a melt flow index of 14.32 g/10 min and a flow beginning temperature (Tfb) of 218.2° C., indicating that it had good extrusion processability. Furthermore, the resin showed melt viscosities (Pa·s) of 40,950 at 230° C. and 12,830 at 235° C., indicating that there was no yarn breakage during extrusion. In addition, the TPU yarn had a good surface.

When a TPU yarn was produced using the TPU resin containing 10 phr of the master batch (trade name: NS-75D-4) according to the present invention, the resin showed a melt flow index of 8.35 g/10 min and a flow beginning temperature (Tfb) of 222.3° C., indicating that it had good extrusion processability. Furthermore, the resin showed melt viscosities (Pa·s) of 44,380 at 230° C. and 14,030 at 235° C., indicating that there was no yarn breakage during extrusion. In addition, the TPU yarn had a good surface.

When a TPU yarn was produced using the TPU resin containing 20 phr of the master batch (trade name: NS-75D-5) according to the present invention, the extrusion processability of the resin was good, and no yarn breakage occurred, but there was a disadvantage in that the TPU yarn had a slippery surface.

The above test results indicated that, in the process of producing the TPU yarn by compounding TPU with the master batch of the present invention, it is most preferable to add the master batch (containing 30 wt % of silica nanopowder) in an amount of 5-10 phr. In addition, it was seen that, when the master batch was added in an amount of 20 phr or more, severe blooming in the TPU yarn appeared.

Meanwhile, Table 3 below shows a comparison of physical properties between a core-free TPU yarn produced using silica nanopowder and a core-free TPU yarn produced using general silica powder. Specifically, Table 3 below compares the physical properties of a TPU yarn produced using silica nanopowder having a particle size of 5-30 nm with those of a TPU yarn produced using silica powder having a particle size of 300-500 nm.

TABLE 3

| Comparison items | Use of general silica powder | Use of silica nanopowder | Remarks |
|---|---|---|---|
| TPU grade | Core-free TPU yarn resin (trade name: NS-75D-10) | Core-free TPU yarn resin (trade name: NS-75D-4) | Compounded with 10 phr of TPU containing 30 wt % of general silica powder or silica nanopowder |
| Silica particle size | 300-500 nm | 5-30 nm | Silica powder product having a particle size of less than 5 nm is not currently available; yarn breakage could occur when a silica powder product having a particle size of more than 30 nm was added. |
| TPU MFI (melt flow index) | 7.3 | 8.35 | 230° C., 2.16 kgf |
| TPU Tfb (flow beginning temp.) | 224.5 | 222.3 | |
| TPU tensile strength | 250 kgf/cm² | 350 kgf/cm² | Use of injected sample |
| TPU tear Strength | 178 kgf/cm | 205 kgf/cm | Use of injected sample |
| TPU specific gravity | 1.23-1.26 | 1.22-1.25 | g/cc |
| TPU hardness | 75 ± 3D | 75 ± 3A | Shore D |
| TPU yarn thickness | 50 denier | 50 denier | |
| TPU surface state | Very rough | Good | |
| Extrusion processability | Due to a large silica particle size, severe yarn breakage occurred during TPU yarn extrusion, making the extrusion process difficult. | Good extrusion processability without breakage of TPU yarn | |

As can be seen in Table 3 above, when the core-free TPU yarn was produced using general silica powder (having a particle size of 300-500 nm), there were problems in that the TPU yarn had a rough surface and the extrusion processability of the resin was poor. Particularly, when the general silica powder was used, a TPU yarn having a small thickness of less than 50 denier could not be produced.

On the contrary, when the core-free TPU yarn was produced using silica nanopowder having a particle size of 5-30 nm, the TPU yarn had a good surface, no yarn breakage during extrusion occurred, and the TPU resin showed good processability.

As described above, according to the present invention, it is possible to produce a thermoplastic polyurethane yarn, which can exhibit the effects of the thermoplastic polyurethane-coated yarn disclosed in the prior art patent documents and also has a small thickness of 50 denier or less.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A core-free thermoplastic polyurethane yarn formed with a resin, wherein the resin comprises thermoplastic polyurethane as a base polymer of the core-free thermoplastic polyurethane yarn, and silica nanopowder mixed to the thermoplastic polyurethane by melt extrusion, wherein the silica nanopowder has a particle size of 5 to 30 nm, wherein the core-free thermoplastic polyurethane yarn has a thickness of 50 denier or less.

2. The core-free thermoplastic polyurethane yarn of claim 1, wherein the resin is formed in pellets.

* * * * *